United States Patent
Kapur et al.

(10) Patent No.: US 8,660,818 B2
(45) Date of Patent: Feb. 25, 2014

(54) SYSTEMIC DIAGNOSTICS FOR INCREASING WAFER YIELD

(75) Inventors: Rohit Kapur, Cupertino, CA (US); Mallika Kapur, Cupertino, CA (US); Maya Kapur, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 580 days.

(21) Appl. No.: 12/854,120

(22) Filed: Aug. 10, 2010

(65) Prior Publication Data

US 2011/0040528 A1    Feb. 17, 2011

Related U.S. Application Data

(60) Provisional application No. 61/233,094, filed on Aug. 11, 2009.

(51) Int. Cl.
  *G06F 11/07* (2006.01)
(52) U.S. Cl.
  USPC .......................................................... 702/183

(58) Field of Classification Search
  USPC ............ 702/81, 82, 108, 118–120, 122, 123, 702/182, 183; 703/14, 22
  See application file for complete search history.

(56) References Cited

U.S. PATENT DOCUMENTS

| | | | |
|---|---|---|---|
| 2006/0066339 A1* | 3/2006 | Rajski et al. | 324/765 |
| 2009/0172611 A1* | 7/2009 | Tanaka | 716/4 |
| 2009/0210183 A1* | 8/2009 | Rajski et al. | 702/84 |

* cited by examiner

*Primary Examiner* — Mohamed Charioui
(74) *Attorney, Agent, or Firm* — Bever, Hoffman & Harms, LLP; Jeanette S. Harms (57) ABSTRACT

A method of performing systemic diagnostics for a wafer includes selecting a design for manufacturability (DFM) rule for analysis. For each IC chip on the wafer, two sets of IC features adjacent the rule can be extracted based on the chip's layout design. Upconverted diagnostics can be run to generate computed numbers associated with combination categories for each set. Zonal analysis can be run on the two sets using the computed numbers to derive metrics for the two sets. A report can be generated based on the zonal analysis.

14 Claims, 6 Drawing Sheets

SYSTEMIC DIAGNOSTICS FOR INCREASING WAFER YIELD

RELATED APPLICATIONS

This application claims priority of U.S. Provisional Patent Application 61/233,094, entitled "Systemic Diagnostics To Callibrate DFM Rules" filed Aug. 11, 2009.

BACKGROUND OF THE INVENTION

1. Field of the Invention

The present invention relates to systemic diagnostics for increasing wafer yield, and in particular to deriving metrics that facilitate calibration of design for manufacturability rules.

2. Related Art

One critical aspect of semiconductor manufacturing is ensuring good yield, i.e. the percentage of good chips on a wafer, when transitioning to a newer, smaller technology node. Unfortunately, current technology node transitions can result in yields being reduced even to 5%. Using feedback from running multiple wafers at a particular technology node, the yield can eventually be improved to a level consistent with commercial wafer production, e.g. 70%.

Improving the yield typically involves fabricating test chips on a wafer, each test chip including one library cell of each type, and then determining which library cells passed or failed. Using this information, "rules" can be generated for each technology node based on predetermined process conditions. These rules are developed by the wafer fabrication facility (i.e. a fab) and then provided to an integrated circuit (IC) design facility. Notably, this development requires multiple rounds of fabricating test chips, which is both resource and time intensive.

At this point, each designer can select which of the rules (e.g. hundreds or even thousands of rules) should be used for a new IC design. Specifically, some rules are mandatory whereas other rules are optional. Applying all of the rules to the IC design typically results in an undesirably large file size. Additionally, applying all of the rules may create an overly conservative IC design, which in turn may require a larger silicon footprint.

Therefore, although mandatory rules are followed, an IC design may use only a subset of the optional rules. Because of its complexity, a state of the art IC design may be divided into sections, each section of the IC design being assigned to a different designer or design team. Notably, each designer/design team may choose to apply any of the suggested rules. These mandatory and optional rules as well as other practices in the industry for improving yield have been called "Design For Manufacturability" (DFM).

Figure 1:
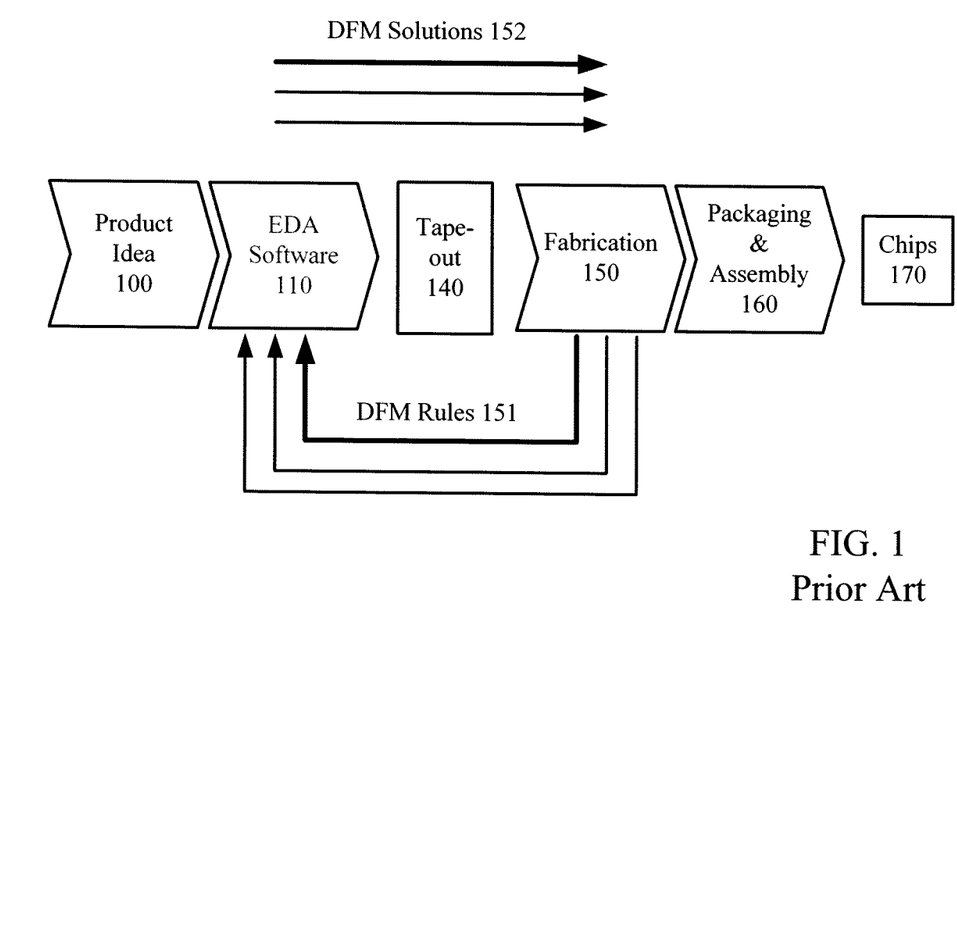
FIG. 1 illustrates a simplified representation of an exemplary digital ASIC design flow including conventional DFM.

FIG. 1 illustrates a simplified representation of an exemplary digital ASIC design flow including conventional DFM. At a high level, the process starts with the product idea (step 100) and is realized in an EDA software design process (step 110). When the design is finalized, it can be taped-out (event 140). After tape out, the fabrication process (step 150) and packaging and assembly processes (step 160) occur resulting, ultimately, in finished chips (result 170). The DFM rules 151, which are derived from analysis performed after fabrication, can be provided to designers for use in the EDA software design process. Applying DFM rules 151 provides DFM solutions 152, which can affect the EDA software process, tape-out, and fabrication. As describe above, the DFM rules 151, and thus DFM solutions 152, typically change based on multiple fabrications of test chips until final DFM rules 151 (bold line) are finalized, thereby producing optimized DFM solutions 152 (bold line).

Thus, the time to develop DFM rules 151 for a new technology node can significantly slow down the design flow. Therefore, it would be advantageous to develop rules that can leverage the design flow, e.g. in the EDA software process (step 110). Moreover, because optional rules have been subjectively selected for application, improvements in DFM have been inconsistent for different IC designs or even within the same IC design. Therefore, ensuring more consistent application of the rules during the EDA software process may also result in consistent improvements in DFM solutions.

SUMMARY OF THE INVENTION

A method of performing systemic diagnostics for a wafer is described. The wafer includes a plurality of integrated circuit (IC) chips fabricated according to a layout design. The method comprises selecting a design for manufacturability (DFM) rule for analysis. For each IC chip, two sets of IC features adjacent the rule can be extracted based on the layout design. Upconverted (i.e. set-based) diagnostics can be run to generate computed numbers associated with combination categories for each set. Zonal analysis can be run on the two sets using the computed numbers to derive metrics for the two sets. A report can be generated based on the zonal analysis.

The combination categories can be based on both simulation results and test results. Specifically, the combination categories include test fail and simulation fail (TFSF), test fail and simulation pass (TFSP), and test pass and simulation fail (TPSF). The zonal analysis includes deriving the metrics using TFSF, TFSP, and TPSF. For example, in one embodiment, the zonal analysis can derive a response metric:

$$\frac{TFSF}{TFSF + TPSF}.$$

In another embodiment, the zonal analysis can derive an impact metric:

$$\frac{TFSF}{TFSP + TFSF}.$$

Notably, an imbalance in like metrics for the two sets can advantageously indicate an effectiveness of the rule for improving wafer yield.

DETAILED DESCRIPTION OF THE FIGURES

To ensure optimized, consistent improvements in DFM, systemic diagnosis of various rules can be performed at the EDA stage. This systemic diagnosis is similar to hypothesis testing in the medical field. Specifically, each test group for a new drug includes one group of patients receiving the new drug and another group of patients receiving a placebo. By analyzing the responses of the two groups over time, the true effectiveness of the drug can be determined.

In the IC test industry, the wafer fab can provide the designer with information on which chips passed, failed, and limited failure data (e.g. specific output signals of failed chips). The designer, with state of the art tools, can use this information to determine where the failures occurred in the design. This location determination is commonly called "diagnostics" and a tool providing such diagnostics is generically called "diagnostic software". Note that the diagnostic software may indicate one location as being the source of a fault, but alternatively may indicate multiple locations as being the source of a fault. In the case of multiple locations, the source of the fault is not specifically found; however, at least the possible sources of the fault are identified.

At this point, the designer can compare the diagnostic results from different chips of the wafer. For example, perhaps a first chip has faults at locations A, B, and C, a second chip has faults at locations A, H, and M, and a third chip has faults at locations A, I, and Q. Using this information, which can be input into a histogram to facilitate review, the designer can determine that fixing the faults at location A on the chips will significantly improve yield because all three chips currently have faults at location A. That is, fixing the highest frequency faults based on chip location results in the most improvement on yield. Notably, the above-described location determination is currently uncorrelated to features at those locations.

Figure 2:
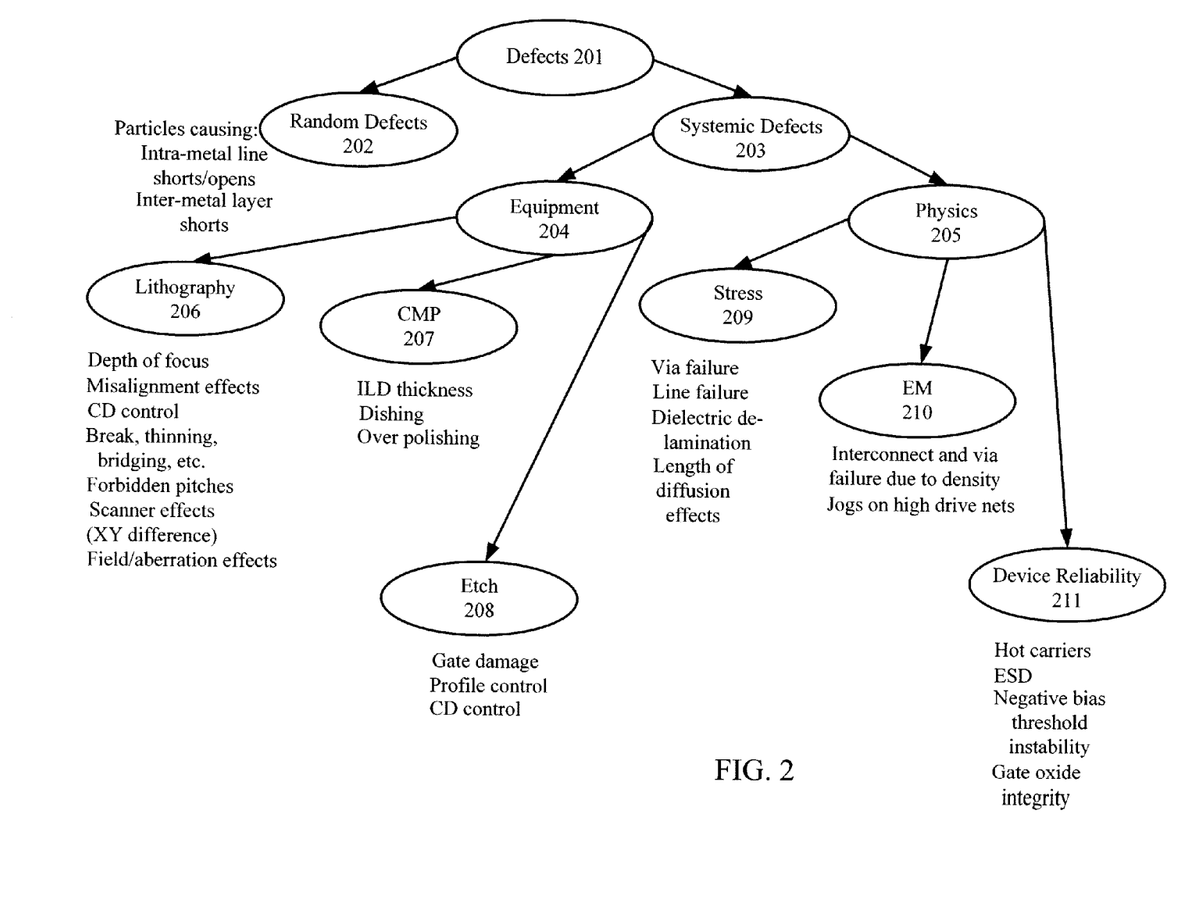
FIG. 2 illustrates exemplary types of systemic defects and random defects.

In accordance with one aspect of an improved yield improvement technique, the systemic nature of faults is leveraged. That is, many faults in increasingly smaller technology nodes may be traced to systemic issues, e.g. the thickness of lines, the number of jogs in a line, etc. FIG. 2 illustrates exemplary types of systemic defects and random defects.

Note that a set of defects 201 can be divided into a set of random defects 202 and a set of systemic defects 203. Random defects 202 can include particles that cause intra-metal line shorts/opens as well as inter-metal layer shorts. Systemic defects 203 can include equipment defects 204 and physics defects 205.

Exemplary equipment defects can include lithography defects 206, CMP (chemical mechanical polishing) defects 207, and etch defects 208. Lithography defects 206 can be associated with depth of focus, misalignment effects, critical dimension (CD) control, breaks/thinning/bridging, forbidden pitches, scanner effects (xy difference), or field/aberration effects. CMP defects 207 can be associated with ILD (inner layer dielectric) thickness, dishing, or over polishing. Etch defects 208 can be associated with gate damage, profile control, or CD control.

Exemplary physics defects can include stress defects 209, EM (electromagnetic) defects 210, and device reliability defects 211. Stress defects 209 can be associated with via failure, line failure, dielectric de-lamination, or the length of diffusion effects. EM defects 210 can be associated with interconnect and via failure due to density or jogs on high drive nets. Device reliability defects 211 can be associated with hot carriers, ESD (electrostatic discharge), negative bias threshold instability, or gate oxide integrity.

Notably, reference to only location may not provide sufficient information to resolve the fault. Specifically, the fault may arise due to a combination of design feature characteristics at that location. For example, one fault may be associated with a double via configuration and a jog in the line. Such complexity would be difficult for a designer to identify when reviewing tens or even hundreds of locations.

Figure 3:
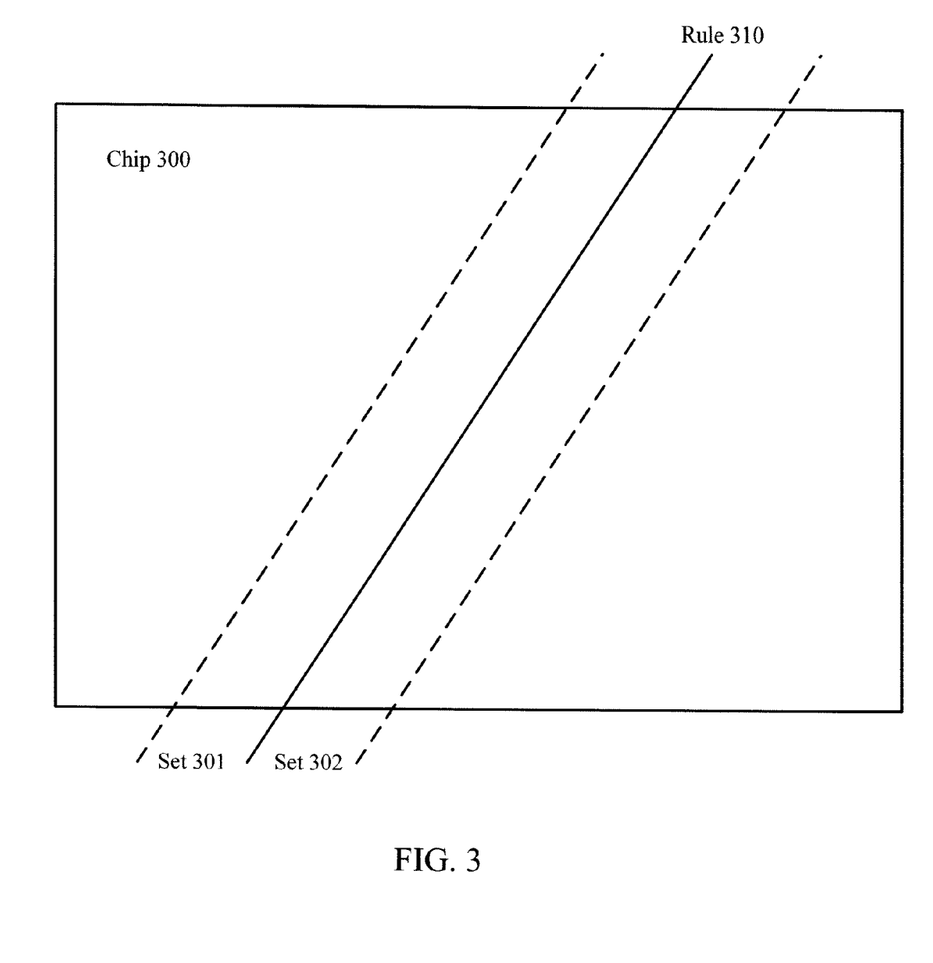
FIG. 3 illustrates conceptually how two sets can be tested against each other, each set being adjacent a DFM rule.

Systemic diagnosis, as described below, can advantageously determine the effectiveness of any rule to improve wafer yield. In systemic diagnosis, two sets are tested against each other to determine a potential placebo effect. FIG. 3 illustrates conceptually how two sets on an IC chip can be tested against each other, each set being adjacent a DFM rule.

FIG. 3 show a chip 300 in which two sets 301 and 302 have been identified based on a rule 310. Note that the two sets are adjacent to rule 310, but are non-contiguous (i.e. do not include the same features) to ensure optimized diagnostics. Assume, for purposes of illustration, that rule 310 refers to placing double vias (that is, doubling the number of vias) wherever there are at least 5 stacked vias. Set 302 could be locations on chip 300 with 5 or more stacked vias (with double vias), whereas set 301 could be locations on chip 300 with 4 stacked vias (i.e. <5 stacked vias and thus without double vias). As described in further detail below, an imbalance of like metrics between sets 301 and 302 can advantageously indicate whether the rule can effectively improve yield.

Figure 4:
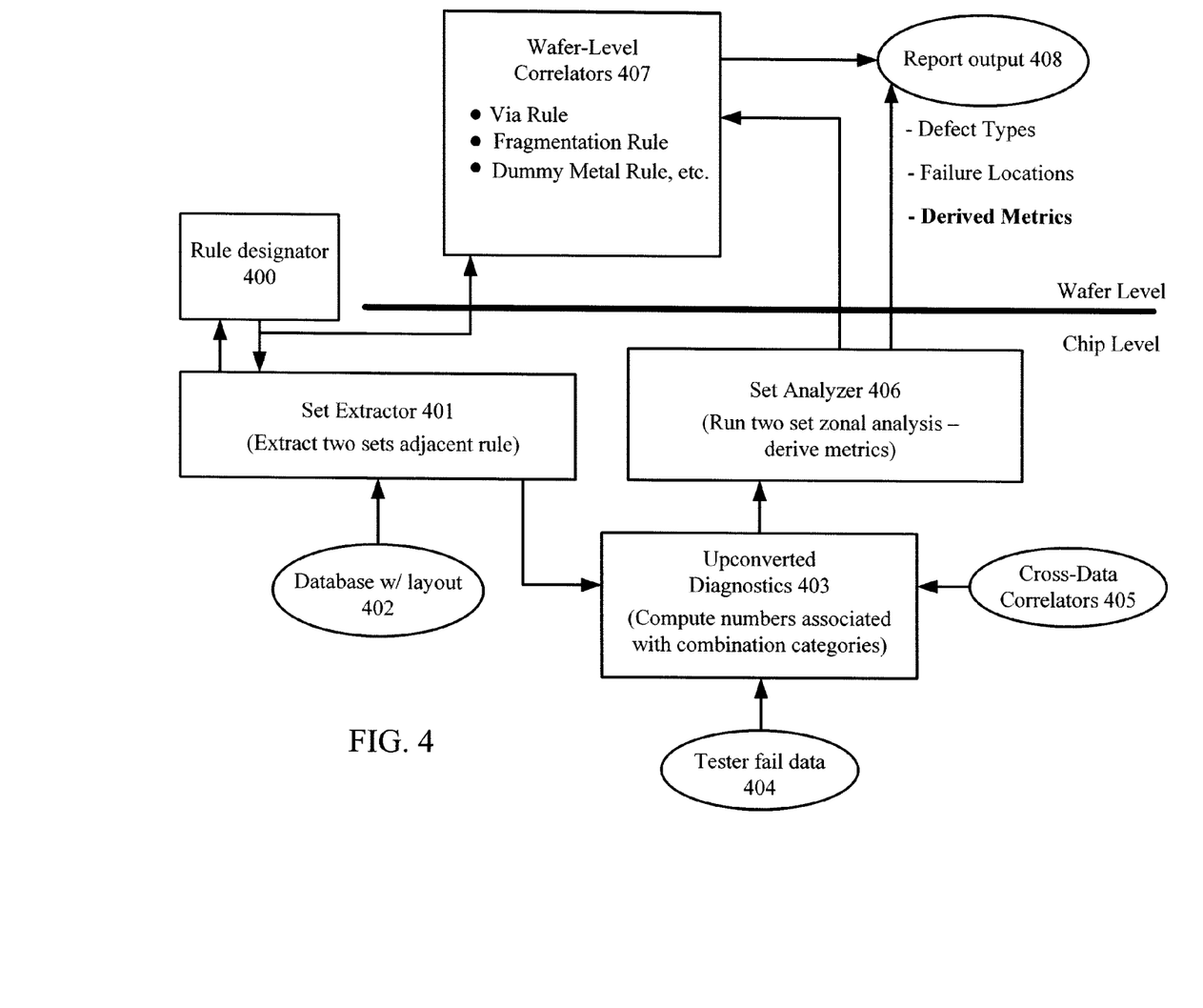
FIG. 4 illustrates exemplary tools that can implement a systemic diagnostic technique.

FIG. 4 illustrates exemplary tools that can implement a systemic diagnostic technique. A rule designator 400 can designate the rule under analysis. In one embodiment, a user interface can facilitate user input to designate rule selection. In another embodiment, a processor can automatically designate one or more default rules. A set extractor 401 can receive the designated rule from rule designator 400 as well as the design layout from a database 402. Using this input, set extractor 401 can extract the layout locations on the chip to populate the two sets adjacent the rule.

In one embodiment, set extractor 401 can provide the set information to rule designator 400 to facilitate rule adjustment. For example, returning to the above-described rule regarding double vias for at least 5 stacked vias, the set can be changed to include more locations (e.g. set 301 including locations with 3 and 4 stacked vias) or less locations (e.g. set 302 including only 5 and 6 stacked vias). This adjustment of set size can be characterized as "zone" sensitivity. Zones can be based on cell type, cell orientation, fracturing, net jogs, non-uniform pitches, stacked vias, or other criteria. Thus, a "zone" as used herein refers to the scope of the sets adjacent the rule, whereas each set is populated by specific locations of the design layout, each location having an associated feature type (both location and feature type provided by set extractor 401).

Upconverted (i.e. set-based) diagnostics 403 can compute numbers for the locations that populate the two sets. These numbers are associated with combination categories. Specifically, upconverted diagnostics 403 can use both simulation data (e.g. generated by a tool providing upconverted diagnostics 403) and actual test fail data 504 to compute the numbers and derive the metrics. The results of both simulation and test data can be characterized as a combination category (described in further detail below). In one embodiment, cross-data correlators 405 can also be provided to upconverted diagnostics 403 to facilitate the review of complex rules. That is, when a complex rule is created, there could be cases where one rule is met and the other is not met. Cross-data correlators 405 can be used by upconverted diagnostics 403 to deal with cases where only X out of Y rules forming a complex rule are met (X and Y being positive integers, with X<Y).

A set analyzer 406 can receive the output of upconverted diagnostics 403 and run the two set zonal analysis, which derives one or more metrics for each set (described in detail below). Note that tools 401-406 can be characterized as being at the chip level. Wafer-level correlators 407 can receive the output of set analyzer 506 for multiple chips to generate wafer-level information. A report output 408 can be either at the chip-level (as provided by set analyzer 406) or at the wafer-level (as provided by wafer-level correlators 407). In either case, report output 408 is based on the analyzed rule, as indicated by rule designator 400. Report output 408 can include defect types, failure locations, and derived metrics.

In accordance with one aspect of the zonal analysis performed in set analyzer 406, the designated sets should create a metric imbalance to justify using a particular rule. Note that, in general, if the two sets using double vias (e.g. ≥5 stacked vias and <5 stacked vias) both result in an equal number of defects, then the rule will not significantly affect yield. On the other hand, if a first set has significantly more defects than a second set, then there is a high probability that a rule directed to the first set can significantly improve yield. Note that zonal analysis uses derived metrics rather than simply the number of defects.

Systemic diagnostics allowing user input via rule designator 400 can facilitate complex rule making. For example, perhaps a double via rule with at least 5 stacked vias does not improve yield, but a complex rule including double vias with at least 5 stacked vias in an IC location having 2 or more jogs within a predetermined distance of the stacked vias can significantly improve yield. Notably, set analyzer 406 can quickly determine the effectiveness of the designated rule no matter how complex.

Note that set extractor 401 always works with two sets. Thus, if the designated rule is not effective, then another two sets can be formed using a new rule and new zones. Furthermore, even when the designated rule is effective, then zonal analysis can advantageously determine whether an even more effective rule can be designated.

In one embodiment, each of the two sets represents the total set of the features on the chip. For example, returning to double via rule 310 (FIG. 3), set 301 would include all chip locations that have 4 stacked vias, and set 302 would include all chip locations that have at least 5 stacked vias. In another embodiment, each of the two sets represents a random sampling of the total set of features on the chip. In this case, set 301 would include a percentage of chip locations, which are randomly selected, that have 4 stacked vias, and set 302 would include the same (or different) percentage of chip locations, once again randomly selected, that have at least 5 stacked vias. Note that the selected percentage should be statistically significant to provide helpful diagnostic results (i.e. what locations are failing). For example, having a set of 5 locations may not be as helpful as 100 when the total number of locations is 200. In one embodiment, a user may determine that selected percentage (e.g. using rule designator 400, FIG. 4).

Figure 5:
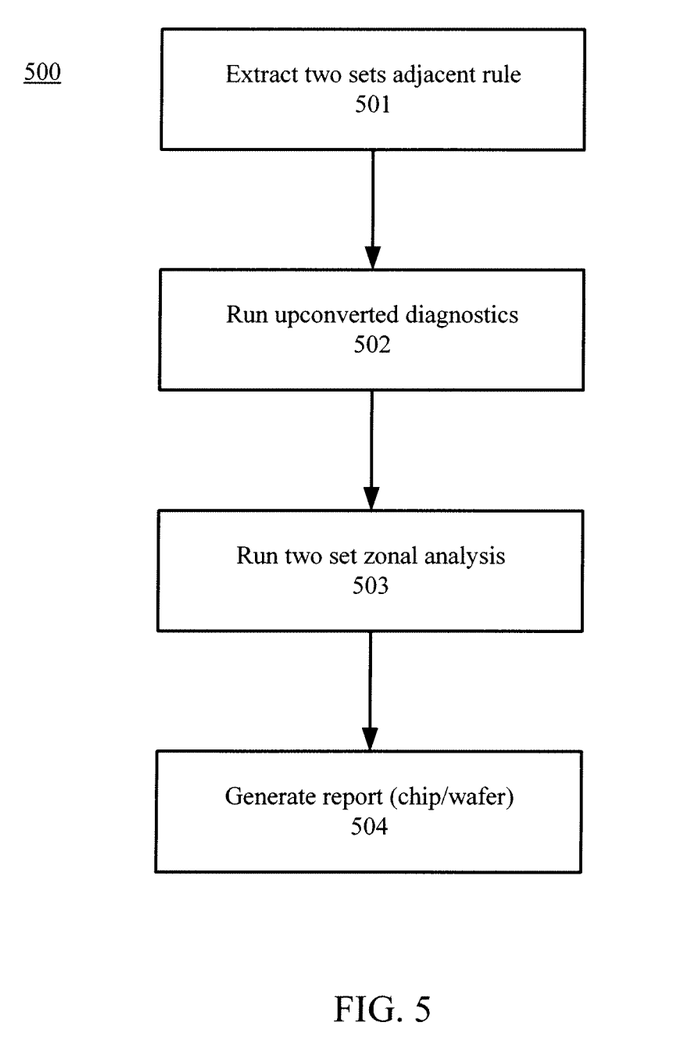
FIG. 5 summarizes the steps of an exemplary systemic diagnostic technique.

FIG. 5 summarizes the steps of an exemplary systemic diagnostic technique 500. In step 501, after a rule is designated, two sets of layout features can be automatically extracted from a layout design. Step 502 can run upconverted diagnostics on the two sets. Step 503 can run zonal analysis on the two sets. Based on this zonal analysis, step 504 can generate a report. Note that this report can be generated at the chip level or at the wafer level.

In accordance with one aspect of systemic diagnostics, a number can be computed for each fault that is identified during step 502. This computed number is based on results of both simulation and tester output. Specifically, the results of the simulation and the tester output may not agree, i.e. one may "pass" whereas the other may "fail". Therefore, four combination categories can exist: tester fail & simulation fail (TFSF), tester fail & simulation pass (TFSP), tester pass & simulation pass (TPSP), and tester pass & simulation fail (TPSF). From the perspective of the fault, a tester fail & simulation fail (TFSF) means that that fault is to blame, a tester fail & simulation pass (TFSP) result means that that fault along with another fault is to blame for the failure, a tester pass & simulation pass (TPSP) result means that that fault is not to blame, and a tester pass & simulation fail (TPSF) result means that no failure occurs.

The zonal analysis, which is performed in step 503, can derive one or more metrics for each set. The comparison of these metrics determines the effectiveness of the rule for improving yield. One metric that can be derived based on the computed numbers effectively asks, "How good is the fault in explaining the failure?" This metric, called the response metric herein, can be represented by:

$$\frac{TFSF}{TFSF + TPSF}$$

Another metric that can be derived based on the computed numbers effectively asks, "What is the fault's impact in explaining the failure?" This metric, called the impact metric, can be represented by:

$$\frac{TFSF}{TFSP + TFSF}$$

Notably, each set includes multiple locations, wherein each location can be designated a fault for purposes of deriving the above metrics. By using simulation and tester outputs, each combination category number can be computed for each location/fault. That is, after simulation and testing of the IC, a simulation result and a test result will be known.

Consider a design with 5 outputs with faults occurring in locations that are in the cone of logic of all the 5 outputs. This design has 3 tests which show the following response when 3 faults exist in the design on some systematic behavior. The following table shows the tester response on Row 1, and the simulation behavior is shown on the remaining rows. Each test has a response seen on 5 outputs where 0 represents a pass and a 1 represents a failure:

| Tester Observation | T1 = 10000 | T2 = 01000 | T3 = 00100 |
| --- | --- | --- | --- |
| Simulation F1 | T1 = 10000 | T2 = 00000 | T3 = 00000 |
| Simulation F2 | T1 = 00000 | T2 = 01000 | T3 = 00000 |
| Simulation F3 | T1 = 00000 | T2 = 00000 | T3 = 00100 |

As one can see, F1 explains the failure on T1, F2 explains the failure on T2 and F3 explains the failure in the third pattern. The response metric for F1, F2 and F3 would be 1, 1, and 1 because every time simulation fails the tester also fails and there is no condition where the simulation failed and the tester observation was a pass. To be specific, F1 only fails on the first output on the first test. When this is compared to what happens on the tester at that event the tester also has a failure. Hence, 1/1=1 for the response metric for F1. For the impact metric for F1, all the cases where the tester failed can be compared to the cases where the fault failed. For F1, only one of the three tester failure matches the simulation behavior. Hence, the impact metric is ⅓ for F1. In this example, it is the same for all the three. Now these metrics can be used to compare sets. If the three faults were in the same set of systematic behaviors, then the cumulative metric computed in the set would be ⅓*1+⅓*1+⅓*1=1. In the other set, where no failures occurred, the metric would be 0.

In one embodiment of zonal analysis, the response and impact metrics can be derived for each extracted set. If an imbalance exists between the metrics (at least one of the response and impact metrics), then the wafer yield can be improved by using the rule. Moreover, the rule can be easily changed to determine whether the imbalance can be increased, thereby increasing the impact to wafer yield.

Figure 6:
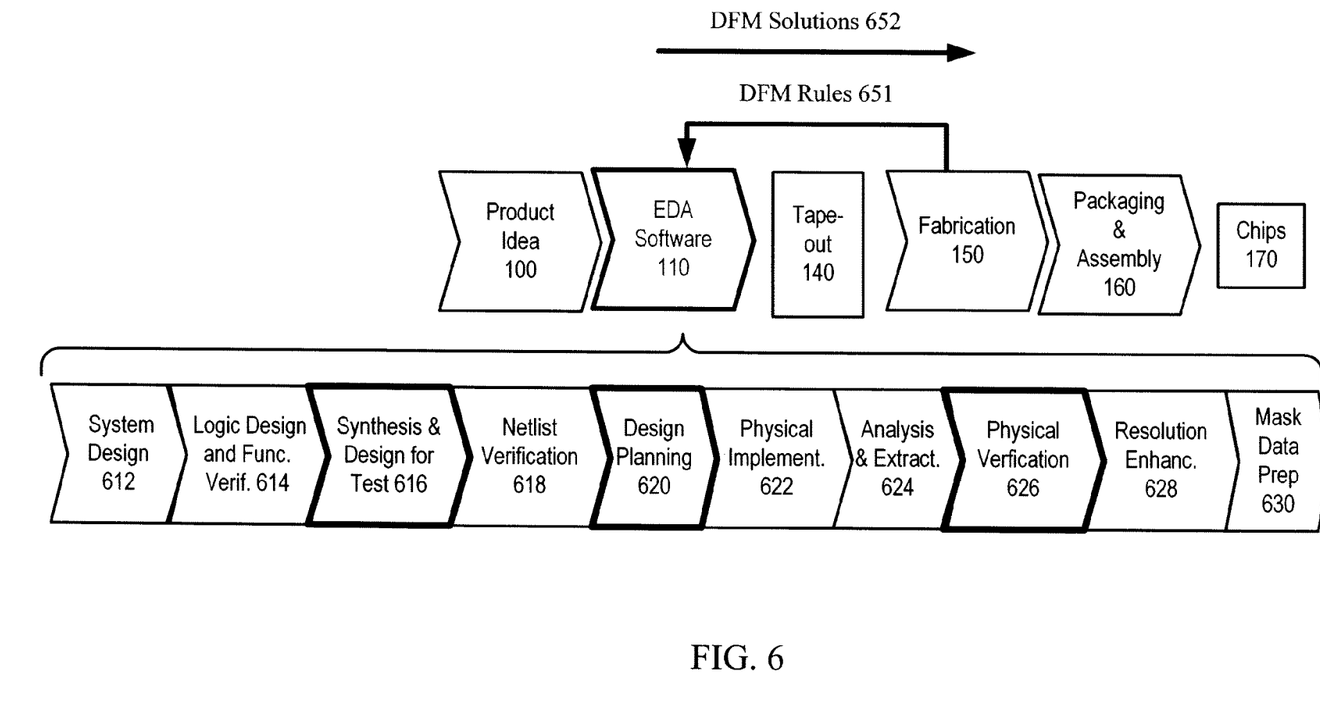
FIG. 6 illustrates the steps of an electronic design automation (EDA) software design process.

Referring to FIG. 6, the EDA software design process (step 110, FIG. 1) is actually composed of a number of steps 612-630, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 610) will now be provided:

System design (step 612): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 614): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS, VERA, DesignWare®, Magellan, Formality, ESP and LEDA products.

Synthesis and design for test (step 616): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, TetraMAX, DesignWare®, and Yield Explorer products. In one embodiment, the diagnostics of the TetraMAX tool can be used to isolate candidates for failing devices based on zones (rather than cell-level faults) (e.g. perform the function of upconverted diagnostics 403 and set analyzer 406, FIG. 4), and the Yield Explorer tool can analyze volume diagnostic data to pareto these zones and calibrate layout rules for a particular layout design (e.g. perform the function of wafer-level correlators 407).

Netlist verification (step 618): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 620): Here, an overall floorplan for the chip is constructed and analyzed for timing and top-level routing. Exemplary EDA software products from Synopsys, Inc. that can be used at this step include Astro and IC Compiler products, such as IC Validator. In one embodiment, the IC Validator tool can extract zones for sensitivity to each layout rule.

Physical implementation (step 622): The placement (positioning of circuit elements) and routing (connection of the same) occurs at this step. Exemplary EDA software products from Synopsys, Inc. that can be used at this step include the Astro and IC Compiler products.

Analysis and extraction (step 624): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 626): At this step various checking functions are performed to ensure correctness for: manufacturing, electrical issues, lithographic issues, and circuitry. Exemplary EDA software products from Synopsys, Inc. that can be used at this step include the Hercules product. In one embodiment, the IC Validator tool can provide tester fail data (404, FIG. 4) for use in upconverted diagnostics.

Resolution enhancement (step 628): This step involves geometric manipulations of the layout to improve manufacturability of the design. Exemplary EDA software products from Synopsys, Inc. that can be used at this step include Proteus, ProteusAF, and PSMGen products.

Mask data preparation (step 630): This step provides the "tape-out" data for production of masks for lithographic use to produce finished chips. Exemplary EDA software products from Synopsys, Inc. that can be used at this step include the CATS(R) family of products.

Note that in accordance with the above-described systemic diagnostics, EDA software 110 receives DFM rules 651 based on one test chip (not multiple test chips as required in the past). Using DFM rules 651 as well as simulation and test results (which could be provided with DFM rules 651), the zonal analysis can derive the response and/or impact metrics. Using these metrics, an optimized set of DFM solutions 652 can be used starting in step 110 (EDA software).

The systemic diagnostics described above can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

The embodiments described herein are not intended to be exhaustive or to limit the invention to the precise forms disclosed. As such, many modifications and variations will be apparent. For example, systemic diagnostics can also allow a designer to create his/her own complex rules. Accordingly, it is intended that the scope of the invention be defined by the following Claims and their equivalents.

The invention claimed is:

1. A method of performing systemic diagnostics for a wafer, the wafer including a plurality of integrated circuit (IC) chips fabricated according to a layout design, the method comprising:
   selecting a rule for analysis, the rule being a design for manufacturability (DFM) rule;
   for each IC chip,
   extracting two sets of IC features adjacent the rule based on the layout design;
   running upconverted diagnostics to generate computed numbers associated with combination categories for each set;
   running zonal analysis on the two sets using the computed numbers to derive metrics for the two sets; and
   generating a report based on the zonal analysis,
   wherein the method is performed by a computer.

2. The method of claim 1, wherein the combination categories are based on simulation results and test results.

3. The method of claim 2, wherein the combination categories include test fail and simulation fail (TFSF), test fail and simulation pass (TFSP), and test pass and simulation fail (TPSF).

4. The method of claim 3, wherein the zonal analysis includes deriving the metrics using TFSF, TFSP, and TPSF.

5. The method of claim 4, wherein the zonal analysis derives a response metric:

$$\frac{TFSF}{TFSF+TPSF}.$$

6. The method of claim 4, wherein the zonal analysis derives an impact metric:

$$\frac{TFSF}{TFSP+TFSF}.$$

7. The method of claim 4, wherein an imbalance in like metrics for the two sets indicates an effectiveness of the rule for improving wafer yield.

8. A non-transitory, computer-readable medium storing computer-executable instructions for performing systemic diagnostics for a wafer, the wafer including a plurality of integrated circuit (IC) chips fabricated according to a layout design, the instructions when executed by a processor cause the processor to execute a process comprising:
   selecting a rule for analysis, the rule being a design for manufacturability (DFM) rule;
   for each IC chip,
   extracting two sets of IC features adjacent the rule based on the layout design;
   running upconverted diagnostics to generate computed numbers associated with combination categories for each set;
   running zonal analysis on the two sets using the computed numbers to derive metrics for the two sets; and
   generating a report based on the zonal analysis.

9. The computer-readable medium of claim 8, wherein the combination categories are based on simulation results and test results.

10. The computer-readable medium of claim 9, wherein the combination categories include test fail and simulation fail (TFSF), test fail and simulation pass (TFSP), and test pass and simulation fail (TPSF).

11. The computer-readable medium of claim 10, wherein the zonal analysis includes deriving the metrics using TFSF, TFSP, and TPSF.

12. The computer-readable medium of claim 11, wherein the zonal analysis derives a response metric:

$$\frac{TFSF}{TFSF+TPSF}.$$

13. The computer-readable medium of claim 11, wherein the zonal analysis derives an impact metric:

$$\frac{TFSF}{TFSP+TFSF}.$$

14. The computer-readable medium of claim 11, wherein an imbalance in like metrics for the two sets indicates an effectiveness of the rule for improving wafer yield.

* * * * *